US011281660B1

(12) United States Patent
Pike et al.

(10) Patent No.: US 11,281,660 B1
(45) Date of Patent: Mar. 22, 2022

(54) MULTI-PARALLEL PROCESSING OF N-DIMENSIONAL ORTHOGONAL SPLITS IN TRANSACTIONS AND DATA FOR A DISTRIBUTED TRANSACTION SYSTEM

(71) Applicant: Vytalyx, Inc., Austin, TX (US)

(72) Inventors: Gary Pike, Watchung, NJ (US); David A. Granzotti, Austin, TX (US)

(73) Assignee: Vitalyx, Inc., Austin, TX (US)

( * ) Notice: Subject to any disclaimer, the term of this patent is extended or adjusted under 35 U.S.C. 154(b) by 238 days.

(21) Appl. No.: 16/558,892

(22) Filed: Sep. 3, 2019

Related U.S. Application Data

(60) Provisional application No. 62/725,987, filed on Aug. 31, 2018.

(51) Int. Cl.
| | |
|---|---|
| *G06F 16/20* | (2019.01) |
| *G06F 16/23* | (2019.01) |
| *G06F 16/901* | (2019.01) |
| *G06F 16/27* | (2019.01) |

(52) U.S. Cl.
CPC ......... *G06F 16/2379* (2019.01); *G06F 16/27* (2019.01); *G06F 16/9024* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 2017/0140394 A1* | 5/2017 | Cao | H04L 9/3236 |
| 2018/0227116 A1* | 8/2018 | Chapman | G06F 16/23 |
| 2018/0240107 A1* | 8/2018 | Andrade | G06Q 20/36 |
| 2018/0240112 A1* | 8/2018 | Castinado | G06Q 20/381 |

\* cited by examiner

*Primary Examiner* — Jau Shya Meng
(74) *Attorney, Agent, or Firm* — Kilpatrick Townsend & Stockton, LLP

(57) ABSTRACT

A method of processing data stored in a distributive system may include receiving a data to be stored on a distributed ledger system; fractalizing the transaction data and/or storage data into a plurality of orthogonal components; determining a unique address on the distributed ledger system for each of the plurality of orthogonal components; partitioning the ledger into multiple portions or divisible shares; bifurcating the consensus mechanism between the partitioned ledgers; storing each of the plurality of orthogonal components at the corresponding address in a first ledger; and adding a new block to a second ledger, where the second ledger comprises the unique address on the distributed system for each of the plurality of orthogonal components.

20 Claims, 9 Drawing Sheets

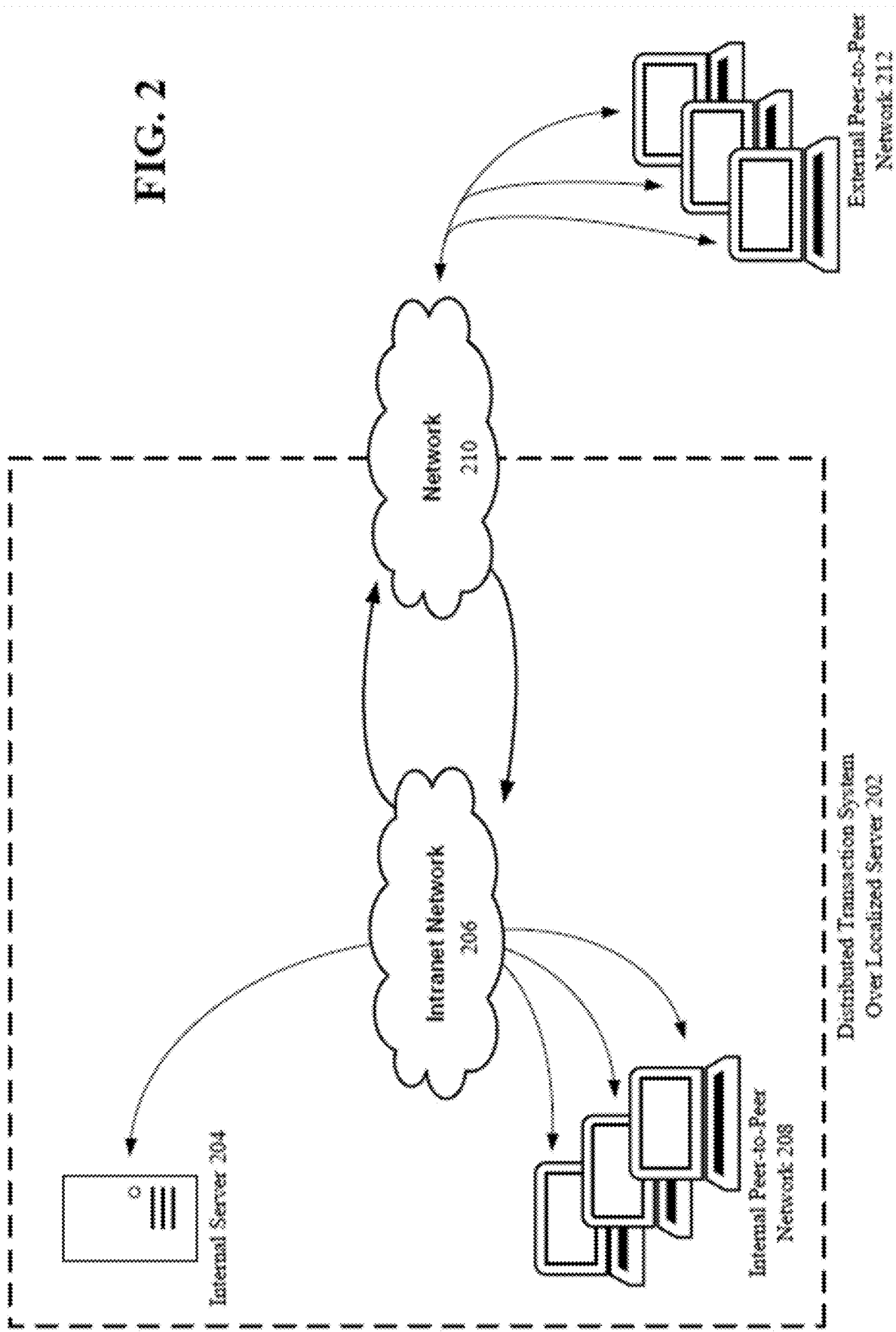

MULTI-PARALLEL PROCESSING OF N-DIMENSIONAL ORTHOGONAL SPLITS IN TRANSACTIONS AND DATA FOR A DISTRIBUTED TRANSACTION SYSTEM

CROSS-REFERENCES TO RELATED APPLICATIONS

This application claims the benefit of U.S. Provisional Patent Application No. 62/725,987 filed on Aug. 31, 2018, which is incorporated herein by reference.

TECHNICAL FIELD

The technology herein relates to distributed transaction systems. More particularly, the technology herein relates to computer systems and processes that interface with distributed transaction systems.

BACKGROUND

Distributed transaction systems, sometimes referred to as hash-based cryptography, blockchain or digital ledger technology, enable the maintenance of a global, append only, data structure by a set of participants in a distributed environment. The system is a data structure that stores a list of transactions and can be thought of as a distributed digital ledger that records transactions between source identifier(s) and destination identifier(s). The transactions are bundled into plurality of blocks, and every proceeding block may refer back to a prior block via a chain or vertex. Computer nodes maintain the blockchain and cryptographically validate each new block as well as the transactions contained in the preceding block. This allows for version control of data in a distributed environment. Examples of distributed transaction systems include but are not limited to blockchain, directed acyclic graphs (DAGs), blockDAG, etc.

The integrity of the entire blockchain, based on a confidence that a previously recorded transaction has not been modified, is maintained because each block refers to or includes a cryptographic hash value of the prior block. Accordingly, once a block refers to a prior block, it becomes difficult to modify the data (e.g., the transactions) contained therein. This is because even a small modification to the data will affect the hash value of the entire block. Each additional block increases the difficulty of tampering with the contents of an earlier block. Thus, even though the contents of a blockchain may be available for all to see, they become practically immutable.

The identifiers used for blockchain transactions are created through cryptography such as, for example, public key cryptography. For example, a user may create a destination identifier based on a private key. The relationship between the private key and the destination identifier can later be used to provide "proof" that the user is associated with the output from that created transaction. In other words, the user can now create another transaction to "spend" the contents of the prior transaction.

As the demand for distributed transaction systems continues to increase, research and development continue to advance these systems not only to meet the growing demand, but to advance and enhance the user experience with such systems.

SUMMARY

In some embodiments a method of processing data stored in a distributive system may include receiving a data to be stored on a distributed ledger system; fractalizing transactions and/or data into a plurality of orthogonal components; determining a unique address on the distributed ledger system for each of the plurality of orthogonal components; partitioning the ledger into multiple portions or divisible shares; bifurcating the consensus mechanism between the partitioned ledgers; storing each of the plurality of orthogonal components at the corresponding address in a first ledger; and adding a new block to a second ledger, where the second ledger may include the unique address on the distributed system for each of the plurality of orthogonal components.

In some embodiments a system may include one or more processors and one or more memory devices comprising instructions that, when executed by the one or more processors, cause the one or more processors to perform operations including receiving a data to be stored on a distributed ledger system; fractalizing transactions and/or data into a plurality of orthogonal components; determining a unique address on the distributed ledger system for each of the plurality of orthogonal components; partitioning the ledger into multiple portions or divisible shares; bifurcating the consensus mechanism between the partitioned ledgers; storing each of the plurality of orthogonal components at the corresponding address in a first ledger; and adding the a new block to a second ledger, where the second ledger comprises the unique address on the distributed system for each of the plurality of orthogonal components.

In any embodiments any of the following features may be included in any combination and without limitation. The consensus mechanism may be bifurcated between the first ledger and second ledger. The first and/or second ledger may execute a consensus mechanism in parallel on two or more of the plurality of orthogonal components. The first and/or second ledger may be distributed across a plurality of different computing systems. The first and/or second ledger may include a directed acyclic graph (DAG) or blockDAG structure. The second ledger may store hashes for each of the plurality of orthogonal components and an order for each of the plurality of orthogonal components. Fractalizing transaction and/or data into the plurality of orthogonal components may include annotating each of the plurality of orthogonal components within a state space. The method/operations may also include receiving confirmation messages from the first ledger that the plurality of orthogonal components have been processed; and adding the new block to the second ledger when a threshold number of confirmation messages have been received. The method/operations may further include receiving a request to query the data in the first ledger; accessing the new block in the second ledger; accessing the unique address on the distributed system for each of the plurality of orthogonal components; and accessing each of the plurality of orthogonal components in the first ledger. Gas calculations may be performed on the first ledger in parallel. Fractalizing transaction and/or data into the plurality of orthogonal components may include generating a hierarchical structure comprising one or more subsets.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 2 is a conceptual illustration of an example distributed transaction system in a localized environment having interoperability with one or more external distributed transaction systems, according to some embodiments.

DEFINITIONS

Figure 1A:
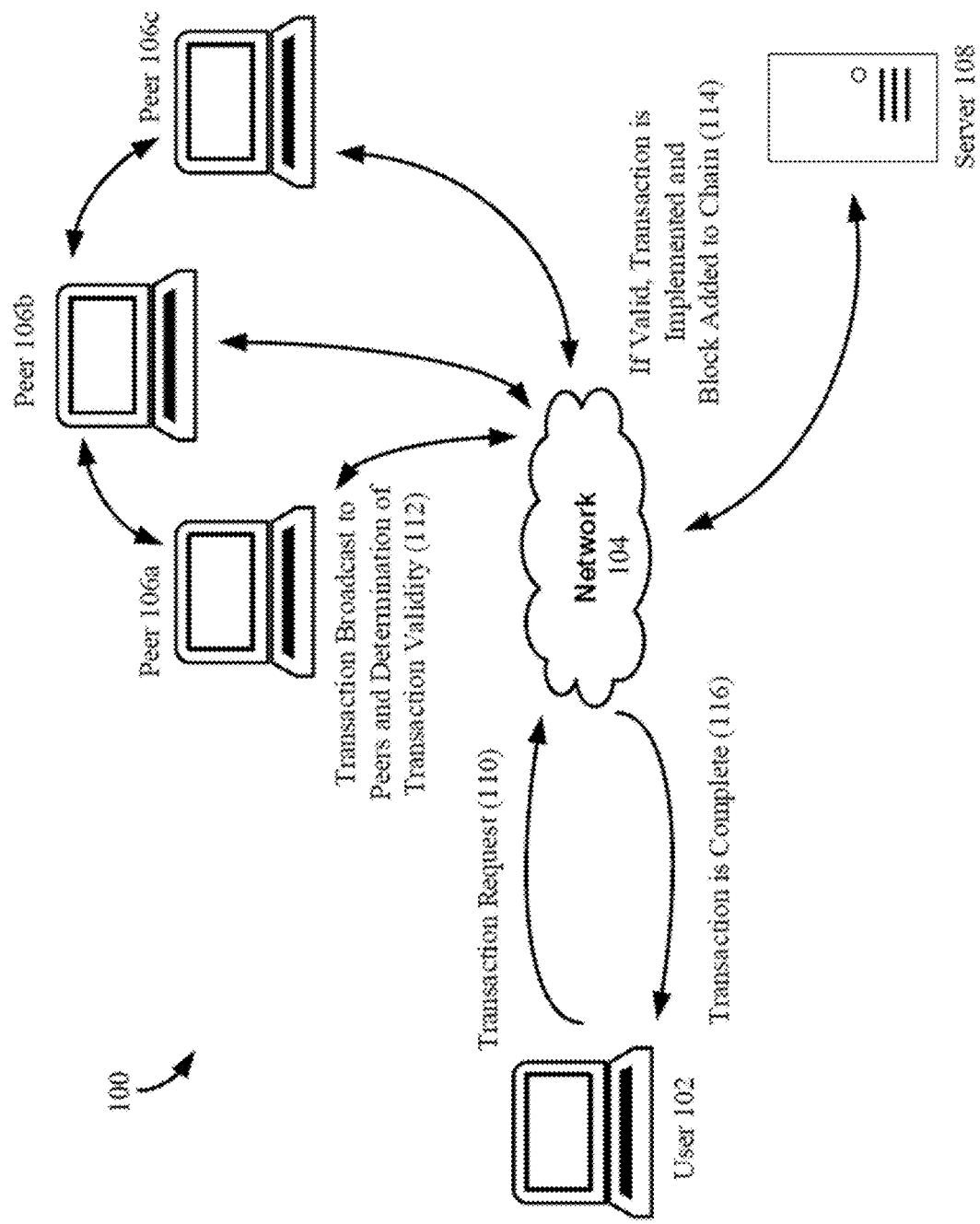
FIG. 1A is a conceptual illustration of an example distributed transaction system, according to some embodiments.

Bifurcated Consensus Mechanism: may include a distributed transaction system that has more than one similar or dissimilar consensus mechanisms that govern one or more portions or divisible shares of the partitioned ledger.

Cardinal Chain: may include a subset of subsets of one or more state channels in a distributed transaction system, wherein one or more cardinal chains may be configured to include a unique address within one or more of a state channel or a partitioned ledger, and data storage capability.

Consensus Mechanism: may include a rule or set of rules that is used in computer and distributed transaction systems to achieve a necessary agreement on one or more data value(s) or a single state of one or more network(s) among distributed processes.

Fractalization: in one or more examples, fractalization may include the reduction of data and/or transactions into their orthogonal constituent parts to be stored, processed and/or updated on a distributive transaction system. In other examples, fractalization may include a process of splitting, dividing, partitioning and/or creating independent components or categories with subsets of subsets of transactions and data down to its lowest reducible value while maintaining independent quality and orthogonality. Some embodiments may include one or more aspects of these examples as is described in more detail below.

Partitioned Ledger: may include a distributed digital ledger in a distributed transaction system that has been divided into two or more portions or divisible shares, with each such portion or divisible share having a similar or dissimilar consensus mechanism.

Peer: may include any type of user that can do peer-to-peer (P2P), machine-to-machine (M2M) or business-to-business (B2B) transactions and any combinatoric iteration in a distributed transaction system.

State Channel: may include a chain parallel to one portion or share of the partitioned ledgers in a distributed transaction system whose role is provided by such portion or share of the partitioned ledger. State channels may be configured to perform parallel processing transactions relative to other state channels of subsets of subsets and adhere to the consensus mechanism of the applicable portion or share of the partitioned ledger. State channels may be interdependent and/or independent from each such portion or share of the partitioned ledger.

User Node: may include any type of node that may or may not be part of a hierarchy in a distributed transaction system. For example, a user node (e.g., FIG. 6, 600) may refer to an authoritative node.

DETAILED DESCRIPTION

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, machine-intelligence-enabled devices, etc.). Machine intelligence may include, but is not limited to artificial intelligence, augmented intelligence, machine learning, deep learning and other forms of machine-based intelligence. While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes. It is intended that innovations described herein may be practiced in a wide variety of devices, chip-level components, systems, distributed arrangements, end-user devices, etc. of varying sizes, shapes and constitution.

In one example, this disclosure aims to alleviate problems related to intranetworking systems such as those found in government and private industries. This includes the silo-ing of data; lack of comprehensive datasets; the isolability of blockchains; the limited throughput capacities of blockchains; the minimal transaction scalability of blockchains; the inconsistency of legacy databases; the challenges of analyzing unstructured data; the lack of data security; the breaching of privacy; and the general ineffectiveness of centralized systems. The bifurcation (dual purpose, two-way split) of the disclosed consensus mechanism and ledger partitioning combined with the multi-parallel processing of n-dimensional orthogonal fractalizations of transactions and data within the distributed transaction system stack may allow execution of high throughput load-balancing and transaction scalability. Fractalization may relate to the process of splitting, dividing, partitioning and/or creating independent components or categories (e.g. subsets of subsets) of transactions and data down to its lowest reducible value while maintaining an independent quality of the discrete (fractalized) forms of the transactions and data. Bridges, which may be specialized integrations of state channels and their respective sub-chains or cardinal chains, may be used to link independent distributed networks for increased interoperability, each with their own application-layer token. Differentially private federated learning, which may be a form of decentralized peer-to-peer machine learning that learns from another party's data without the other party explicitly sharing such data or knowing the other party's data, may use distributed transaction systems to more efficiently store, analyze and process data, accelerating the machine learning process and improving the efficacy of machine learning algorithms. By implementing these systems and methods, the present disclosure significantly improves throughput, scalability, organization, and interoperability of transactions and data for machine intelligence and other data analytics applications across various distributed transaction systems. As described in detail below, companies that need machine intelligence and/or data analytics applications in their organization or practice may use distributed transaction systems to increase data accessibility, utilization, literacy, standardization and security. These machine intelligence and/or data analytics applications may be big-data hungry and compute intensive. Companies that need blockchain-as-a-service can access, share and distribute industry specific data on blockchain in a manner that is standardized, secure, portable and interoperable.

The following disclosure may also relate to decentralized machine intelligence and data analytics applications utilizing a distributed transaction system to support organizational and structural needs in a host of industries. Many industries are overwhelmed by the amount of data required to be processed and are lacking the technology to organize and support utilization of the data. The procurement of highly literate, normalized, structured, secure, and accessible big data while having the proper machine intelligence or data analytics tools may be essential to continued advancements in numerous industries. The more big data sets that contain these features, the greater the non-linear growth of machine intelligence, perhaps by fractal improvements, causing orders-of-magnitude advancements. Unfortunately, today machine intelligence and data management applications may be fragmented by silo-ed, closed and non-interoperable architectures that lack sufficient interoperability across divisional systems, security against increasing cybersecurity threats, and throughput rates for big data and machine intelligence computations.

As the use cases for blockchain in many industries has expanded, many blockchains may naturally exist in isolated siloed environments and use their own proprietary network architectures, data standards and crypto-economics. These blockchains may be unable to communicate with each other and provide data, architectural and crypto-economic uniformity, which may be a critical problem that needs to be addressed. Currently, many blockchains may not allow for data collaboration. Until these blockchains can solve this core problem and design systems that emphasize collaboration over competition, mainstream adoption of blockchain may be difficult to achieve.

In order to integrate big data and machine intelligence systems with blockchains, throughput of high-computation loads and high transaction scalability should be solved. Even blockchains that maintain some of the highest throughput and scalability rates may still suffer from orders-of-magnitude less throughput and scalability than centralized applications (e.g. non-distributed ledger technologies). The lack of blockchains with comparable or even greater throughput and scalability than that of centralized applications may stunt adoption of decentralized applications. Without achieving a level of throughput and scalability that meets or substantially exceeds centralized applications, adoption of decentralized applications such as blockchain may continue to be limited.

Blockchain may fundamentally improve the way that data is transacted, stored and shared. Blockchain may change machine and personal interaction, having an impact in the many industries where interactions and transactions may be severely fragmented, lack throughput, scalability and may not be interoperable. Blockchain is an immutable digital ledger which may allow users to share stores of value across a decentralized network, without the need for a central authority. The blockchain data is immutable, meaning that it is inherently designed to prevent user alterations. Each new block is created from a consensus of validating nodes. These nodes are typically not bundled. It is highly advantageous that nodes are spread out in the network, meaning no one person has control over transaction validation. This makes blockchain "decentralized" (e.g. no central authority). Once entered, transactional information can never be erased, and the blockchain thus contains a certain and verifiable record of every single transaction ever made. This allows users on the blockchain to know for certain that a digital event happened—no single party has the power to tamper with the information. This data integrity property of the blockchain, when coupled with its decentralized nature and proper permissioning, allows for a scalable digital economy. The term blockchain refers to a system of structuring data, and not a particular instance or usage of this structure, such as Bitcoin. Blockchain is also not an actual store of value itself, but the accounting and transacting of value.

Unlike artificial intelligence, which may involve little to no human-machine intercommunication, augmented intelligence is information technology that may be codified to mimic human cognitive functions and may supplement and support human cognition, thinking and analysis. Augmented intelligence leaves the human at the center of human-machine interaction. Augmented intelligence is fundamentally about making smarter and more informed decisions that better simulate, understand and model human decision making, thought, processes and views. However, machine intelligence and data may not be easily accessible, scalable or interoperable. Without data, machine intelligence models may not be accurate. Without accuracy, machine intelligence models may be ineffective. However, custom machine intelligence solutions may often be too costly to implement and "out-of-the-box," and may rarely fit the exact needs of the user.

Migrations to blockchain have, in many cases, only furthered the already abundant fragmentation and lack of interoperability that exists in the market. Many blockchain have attempted to bring highly sensitive, private and regulated information onto blockchain. At first glance, it may appear that many of these blockchains have been able to solve the fragmentation, interoperability and portability issues that exist within the current frameworks. However, each new blockchain launched that does not codify their data to a universal data standard and operate across multiple public, private and cross-chains is potentially exacerbating the very issues these projects are trying to solve. At the very least, the current projects may be stymieing the process of creating less fragmentation, increased collaboration, improved interoperability and greater portability. Typically, each of these new projects has its own data format and isn't interoperable across multiple public, private and cross-chains, let alone from user to user. As a result, professionals using these new blockchains may be unnecessarily tied to yet another proprietary system that fails to solve the problems they are attempting to address.

Many data management systems utilize data interoperability standards that most systems adhere to. The problem may lie with who controls the data. Today, people may not control or own their data. Electronic data records, in general, may belong to the business who created the person's data record and the facility in which the record was created. Only the information gathered within the original record may be owned by the person as a copy and not in electronic form. A significant percentage of persons now frequently change service providers. This may lead to disparate personal records, with fragments of a person's critical history locked up in disconnected silos. With the person being the common link between all of these and providers, placing the control of data in the hands of the person may greatly improve interoperability.

Moreover, many data providers may be reluctant to provide the data needed to train machine intelligence applications and its learning models due to loss of control, privacy and security over such data. In general, there may be a lack of trust with data consumers as various audit, consent, and regulatory frameworks may be hard, if not impossible, to control or govern once the data has been distributed to the data consumer. Data should to be released by data providers, and, into the right hands.

One solution described herein may relate to a distributed network architecture including a machine intelligence-driven, distributed data management model that may support machine intelligence and data analytics applications in a host of industries. Users of the distributed network may utilize a set of smart contract templates and blockchain to improve or accelerate machine learning algorithms. By bringing these applications and distributed networks together, this type of network architecture may become a global intelligence and data exchange commons.

Another solution described herein may involve a protocol having a bifurcated consensus mechanism with supporting mathematical structures and a partitioned ledger that may separate the transactional data from the storage data to maximize throughput and scalability. The first partitioned ledger (or "nexus" ledger) may serve various types of transactions that include currency, multi-chain interoperability and metadata transactions. The second partitioned ledger (or "fractal" ledger) may perform gas calculations, push the gas calculations to the nexus ledger, store active batches or chunks of big data, and transact chunks of big data from one blockchain to another. This bifurcated architecture may allow for distributed computing which maximizes throughput for big data and machine intelligence computations.

For example, the nexus ledger, may use a modified proof of authority (PoA) or bifurcated consensus mechanism consensus mechanism with a blockDAG for the nexus ledger structure implementation. It may primarily store the transactional data. The bifurcated consensus mechanism may only allow accredited organizations to be an authoritative node. The blockDAG may be used for asynchronous block formation in, for example, the PHANTOM consensus protocol. BlockDAG is originally based on the proof of work (PoW) consensus mechanism, however, one implementation may replace PoW with the bifurcated consensus mechanism in the architecture of some embodiments. The nexus ledger may include blocks with transactions and metadata, as well as consensus related blocks such as Epoch and Genesis blocks. The nexus ledger architecture may be serialized, Byzantine-fault tolerant, and may prevent "double-spend" of currency.

The fractal ledger, which also may use the bifurcated consensus mechanism, may perform gas calculations and store data files. All data files may be divided into separate chunks, distributed across the network, and replicated at the end nodes to support data consistency. If the data file is smaller and can be processed efficaciously it may not always need to be "chunked" and stored traditionally. The fractal ledger may work in a similar manner as IPFS by providing a distributed file-system within a protocol stack sitting under the nexus ledger. The fractal ledger may push gas calculations to the nexus ledger to avoid a "double-spend" of currency and may allow the data to be transferred or copied to another blockchain for multi-chain interoperability.

For example, a user may upload a file to node #1 using a blockchain client. The local authoritative node may internally split the file into multiple chunks. The local authoritative node may create a pending transaction on the nexus ledger, reflecting a file storage event. The transaction may contain information about the file, chunks hash, chunks order, and chunks location. Chunks may be broadcasted across the network via broadcasting. The local authoritative node may be waiting for a confirmation message from network participants, that the broadcasted chunks have been saved in other nodes. The chunk may be deemed accepted after at least two confirming messages. Confirmation messages may contain information about locations of chunks in the network, and this information may be recorded into the pending transaction created earlier. When a necessary number of replications is reached, the pending transaction may be added asynchronously into the nexus ledger. One of the authoritative nodes may confirm the transaction into a block, and the validation process may verify each chunk's location on the fractal ledger. A created block's metadata (hash, gas used, etc.) may be processed and confirmed on the nexus ledger when a consensus is reached among the nodes.

The embodiments described herein may include a number of innovations involving fractalization (data storage and data processing), intelligent multi-parallel processing (data processing), and bifurcation (data processing). The first innovation may be to fractalize or n-dimensionally split, divide or partition data and transactions before they are added to the distributed transaction system. Fractalization may relate to the process of splitting, dividing, partitioning and/or creating independent components or categories (with subsets of subsets) in a fractal pattern of transactions and data down to its lowest reducible value while maintaining the independent quality of the discrete (fractalized) forms of the transactions and data. For example, this may be represented as N subsets of data within M subsets of objects. N may represent orthogonal elements of data (OrBits), and M may represent orthogonal groups or categories of aggregated OrBits (chunks). Chunks may be created for engineering efficiencies to optimally process and store both the metadata hashes on the nexus ledger and fractal ledger as described below.

In some embodiments, each of the authorized nodes, which may collectively govern the distributed transaction system, may use swarm intelligence (or other machine intelligence) algorithms to optimally determine which state channels may intelligently multi-parallel process state changes of both ledgers within the distributed transaction system. Utilizing swarm intelligence with a bifurcated consensus mechanism, more metadata hashes, currency, and big data transactions may be processed concurrently. These collective architectures may optimize the distributed transaction system, making the authorized nodes operate more efficiently and intelligently. Intelligent multi-parallel processing may provide higher scalability and throughput, allowing hyper-fast transaction speeds and unlimited amounts of fully encrypted data to be instantly available across the entire distributed network.

For example, upon receiving a record, a compliant node may break the record up into object notation (e.g., JSON). Some embodiments may break the data up into string objects, but generally, the objects may be broken up into any type of quantifiable element or structured format. To quantify the data, the system may use a state space of N variables that fractalize each quantifiable portion. Any bits of data that may be considered orthogonal to each other may be split up and annotated within the state space. For example, blood pressure data in a personal record may be split up into individual orthogonal components. However, the systolic/diastolic numbers may not need to be split up because the numbers may not be independent or orthogonal unless they are paired together.

Each record may include variables within the state space, and each variable within the state space may be symmetric across individual records. For example, a health record may include various state variables that correspond to annotated data within the record, and each of the state variables may be orthogonal or independently considered with regard to each other. However, each record for each user may include values for the same state variables, and thus a state variable may link values between records in the population of records. Because the state space may be symmetric across each of the records, the entire structure may grow in a fractal-like manner, thus warranting the term "fractalization" as used herein. This fractal structure may allow each subset to be part of a superset that can be traversed. After the data chunks are fractalized, they may be annotated with a state space vector. At this point, the data may be structured such that it may be inserted into the bifurcated ledgers.

Some embodiments may use bifurcation, which may include the dual purpose, two-way split of the digital ledger and a bifurcated consensus mechanism. This may involve partitioning the digital ledger into two parts, namely the nexus ledger and the fractal ledger. The dynamic partitioned "nexus ledger" may serve as a dynamic state space that uses the bifurcated consensus mechanism to: (i) store synchronous data, including but not limited to currency and metadata hashes; (ii) asynchronously process currency and metadata transactions to prohibit double spend of transactions; and (iii) be interoperable with multiple third-party networks. The second dynamic partitioned ledger "fractal ledger" may serve as a state space that uses the bifurcated consensus mechanism to: (i) store chunks and/or OrBits; and (ii) process gas calculations that are pushed to the nexus ledger after the processing of such chunks and/or OrBits which transpires within state channels and their subsequent cardinal chains. The consensus mechanism may be bifurcated to use multi-parallel processing.

The nexus ledger may process transactions, and the fractal ledger may process fractalized data concurrently. The nexus ledger may include any type of metadata hashing to reference the fractalized data. The purpose of fractalizing the data and breaking the record up into independent chunks may not only be to annotate the data, but it may also be because these independent chunks may then be processed independently in parallel in the fractal ledger. This may allow multi-parallel processing to occur on the fractal ledger. The nexus ledger may perform traditional DAG-like transaction processing, while the fractal ledger may compute in parallel and may not need to be executed asynchronously. Unlike traditional blockchains, there may be no need to wait for processing to occur in a queue in the fractal ledger.

The nexus ledger may store meta-hashes that reference chunks in the fractal ledger. For example, the nexus ledger may store an array that references individual chunks in the fractal ledger for a specific record. The meta-hash pointers may reference each of the locations in the fractal ledger where the data is stored. Therefore, to update or access data in the fractal ledger, the meta-hash pointers in the nexus ledger may be used. Thus, the data stored in the nexus ledger may be relatively small compared to the relatively large amount of data that can be broken up and processed in parallel in the fractal ledger (e.g., 256 Gb).

In the past, traditional blockchains have only had one main, proven function: sending cryptocurrency from one address to another. This may be mostly because traditional blockchain architectures have several technical limitations. As a result, many traditional blockchains may have failed to capitalize on their many potential real-world use cases.

In a general sense, to improve upon traditional blockchain architectures, the embodiments described herein may bifurcate or partition the traditional digital ledgers. Partitioned ledgers may include a distributed digital ledger that has been divided into two or more portions or divisible shares as described above, with each such portion or divisible share having a similar or dissimilar consensus mechanism. This bifurcated architecture may allow for a more advanced form of distributed computing which may have the capability to maximize throughput for big data and machine intelligence computations and transaction scalability.

The processing that may be done on the fractal ledger may be referred to as a bifurcated consensus mechanism because it may be operated independently and in parallel on each of the chunks sent to the fractal ledger. This may allow consensus to occur concurrently for each of the chunks added to the ledger instead of sequentially in a queue. The bifurcated consensus mechanism may use a modified PoA algorithm.

The nexus ledger may use the bifurcated consensus mechanism described herein with a blockDAG structure described below for the nexus ledger structure implementation. The nexus ledger may be primarily used for storing asynchronous data and processing/metadata transactions.

The fractal ledger may also use the bifurcated consensus mechanism. It may intelligently perform gas calculations, store chunks, OrBits, and/or other data files, and transact chunks and/or OrBits from one distributed ledger technology (DLT) to another DLT. All data files, OrBits, and/or chunks may be distributed across the network and replicated at the end nodes to support data consistency. This may drastically improve the efficiency of sending and storing data. When compared to centralized cloud storage, decentralized cloud storage protocols may provide a cheaper, more efficient, and more secure way of storing, processing and transferring big data. The fractal ledger may push gas calculations to the nexus ledger to avoid double-spend of currency while also allowing the data to be transferred or copied to another DLT for multi-network and bidirectional interoperability.

The modified blockDAG, may be a generalization of Satoshi Nakamoto's chain that suits a setup of fast or large blocks. BlockDAG may use a mathematical structure to distinguish between blocks mined properly by nodes (e.g. authorized nodes) and those mined by non-cooperating nodes that deviated from the DAG mining protocol. Using this distinction, the distributed transaction system may provide a full order on the blockDAG in a way that is eventually agreed upon by all authorized nodes. In one example, the modified blockDAG may be used for the formation of asynchronous blocks in the SPECTRE/PHANTOM consensus protocol. SPECTRE/PHANTOM was originally based on the PoW consensus mechanism, however, some embodiments may replace PoW with the bifurcated consensus mechanism. In general, blockDAG is orders-of-magnitude faster than traditional blockchains. BlockDAG may allow confirmation times on the order of seconds when there might be transaction conflicts. Additionally, as with any DAG or blockDAG may make it possible to reduce fees on transactions, something which isn't possible with earlier generations of traditional blockchains.

However, the PHANTOM consensus protocol contains some upper bound limit restrictions on throughput and scalability. To solve this issue, some embodiments may modify the PHANTOM consensus protocol by removing the upper bound limit restrictions on the Poisson function. As depicted in the equation below, the PHANTOM consensus protocol has set an upper bound limit restriction on how many blocks may be created in parallel.

$$k(D_{max}, \delta) := \min\left\{\hat{k} \in \mathbb{N} : \sum_{j=\hat{k}+1}^{\infty} \left(e^{-2D_{max}\lambda} \cdot \frac{(2D_{max}\lambda)^j}{j!}\right) < \delta\right\}$$

The above equation for the PHANTOM consensus protocol parameterizes a Poisson function but may not optimize the function based on the target variables we may require for throughput and scalability. Some embodiments may, with a normalization of 1 for the probability distribution, push the security element delta equal to 1 (e.g. $\delta=1$). This may allow the distributed transaction system to utilize an unbounded function which is potentially only limited by hardware and bandwidth. By modifying the Poisson function, some embodiments may be able to fully execute mining protocols and broadcast the blockDAG tips (e.g. leading blocks of a graph with degree 0). The PHANTOM consensus protocol may reach a threshold of 0 when $\delta=1$, which may imply that there is no security threshold, making it invariant within this model. This restrictive variable in the PHANTOM consensus protocol, which was not a limitation in the original SPECTRE consensus protocol, may place significant limitations on the goal of infinite throughput and high scalability.

In order for the distributed transaction system to have no limitations and be comparable or superior to the throughput and scalability capabilities of SPECTRE, some embodiments may modify and optimize PHANTOM's Poisson function. The Poisson function may be modified to make the security element invariant. This modification may solve PHANTOM'S upper bound limit restriction on scalability and throughput as well as Theorem 5's security threshold of PHANTOM. This may allow the modified equation to take the following form:

$$k(D_{max}, 1) := \min\left\{\hat{k} \in \mathbb{N} : \sum_{j=\hat{k}+1}^{\infty} \left(e^{-2D_{max}\lambda} \cdot \frac{(2D_{max}\lambda)^j}{j!}\right) \leq 1\right\}$$

This may solve the throughput and scalability issues associated with the PHANTOM consensus protocol in three ways: (1) modification of the Poisson function by removing the security element's variability, which is augmented by the security features provided by the bifurcated consensus mechanism described herein; (2) optimizing the Poisson function by determining the mathematical values that aim to solve the multivariate Nash equilibrium problem; and (3) implementation of the bifurcated consensus mechanism, which only may allow secure, accredited and compliant enterprises to transact on the distributed transaction system. With these, some embodiments may solve the PHANTOM consensus protocol's upper bound limit restrictions and may vastly enhance the speed and breadth of the blockDAG described herein. As a result, these embodiments may regain scalability and throughput, solve non-local block serialization, and create unfettered optimization of the bifurcated consensus voting mechanism.

The mining protocol for the blockDAG is very succinct, yet may be extremely powerful for the nexus ledger. In some embodiments, the mining protocol may have no algorithmic upper bound limit restrictions, other than those associated with upper bound hardware and bandwidth. The mining protocol process may include: (1) during block creation, a script may be placed in the header with all known leaf hashes of degree 0 of the locally observed blockDAG; and (2) after creation or reception of a block, the node may quickly broadcast that information to all network participants. All compliant nodes may be allowed to intelligently operate in parallel, potentially improving throughput and scalability by orders-of-magnitude. The double-spend transaction conflict may be solved by an intelligent proprietary voting mechanism, whereby every block's vote may be based upon its previously created hashes. This may equate to non-local serialization. This may be permitted by only allowing confirmation of blocks from compliant nodes. In some embodiments, compliant nodes may only be run by enterprises that have been accredited by the distributed transaction system and are in compliance with the various privacy laws to which each business enterprise running a compliant node may be subject.

Some embodiments may bifurcate a new consensus mechanism amongst the nexus ledger and the fractal ledger. A blockDAG may serve as the mathematical structure supporting the nexus ledger implementation. The purpose of splitting the consensus mechanism may be to exploit the process of achieving higher throughput for big data, which provides a clear throughput capacity advantage over singular, non-bifurcated consensus mechanism architectures. This may allow more simultaneous and parallel transactions to occur across each ledger, providing a significant throughput and scalability advantage over traditional blockchains or DLTs.

The bifurcated consensus mechanism may be a modified form of PoA that may require any system operating as a node to be compliant with various regulations. Unlike PoW or proof of stake (PoS), there may be no mining mechanism involved with this bifurcated consensus mechanism. Some of the main advantages of the bifurcated consensus mechanism over other consensus algorithms may include low computational power requirements and no requirement for communication between nodes to reach consensus. In addition, continuity of the network may be independent of the number of available genuine nodes since nodes may be preapproved and verifiably trustable through cross verification in the public domain.

Some embodiments may also use machine intelligence for data normalization. Machine intelligence algorithms and/or field mapping may be used to dynamically normalize data, further optimizing the fractalization and intelligent multi-parallel processes. Algorithms that may be bijective in their mapping may optimize the fidelity of the data being converted. Some embodiments may use algorithms such as dynamic Bayesian networks and/or Layered Hidden Markov Models. Once the data are normalized, the data may be converted, transferred, and exchanged under various standards for improved interoperability amongst different systems.

FIG. 1A is a conceptual illustration of an example distributed transaction system on a peer-to-peer network 100. A peer-to-peer network 100 generally does not have a central server that controls operation of the system, but rather each device, such as any of the user device 102 and peers (106a, 106b, 106c) of the network may establish communication links with one or more of the other devices in the system. A client or server 108 may be utilized for any of the devices, allowing access to resources and communication. For example, each of the user device 102, server 108, and peers (106a, 106b, 106c) may maintain a digital ledger used in implementations of the distributed transaction system, and each of the devices may perform ledger verification operations. The devices in the peer-to-peer network 100 may be configured to implement a distributed transaction system such as blockchain, DAG, blockDAG and/or others. Those of ordinary skill in the art will recognize that other means of distributed transaction may be utilized in addition to those described and illustrated herein.

Each of the devices may be a mobile or stationary device with one or more transceivers configured to establish communications links according to one or more wired or wireless communication protocols (e.g., near-field protocols, such as Bluetooth wireless technology, or Zigbit, WLAN protocols, such as a WiFi protocol according to IEEE 802.11k standard, WWAN protocols, etc.). Communication to and from one or more of the of the peer-to-peer network 100 may be implemented using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), etc. A CDMA network may implement one or more radio access technologies (RATs) such as CDMA2000, Wideband-CDMA (W-CDMA), etc. Global System for Mobile Communications (GSM), Digital Advanced Mobile Phone System (D-AMPS), or some other RAT.

Each of the user device 102, server 108, and peers (106a, 106b, 106c) may be configured to facilitate transactions within the network 104. For example, if user device 102 determines to store data on a fractal ledger, the user device 102 may send a request or query to other devices in the network 104 to validate the data. The request or query sent by the user device 102 may be processed by the other devices with an identifier of the user device (e.g., a key). The request generally also includes time data representative of a requested starting time and time duration. The request or query may be timestamped to indicate the time at which the request or query was made. The request or query may be validated by one or more of the other devices within the network 104, allowing the user device 102 to store the data in the fractal ledger. The stored data may relate to cardinal chains or split chains configured to store data inside state channels (for parallel processors). Each chain may include data that is independent or orthogonal or cardinal to other data in another chain.

The fractal ledger may allow for transactions to be processed such that data can be updated and secured. The fractal ledger may constitute a validated record of any transactions that have taken place between the devices of the network 104. In the embodiments described herein, the nexus ledger may provide a trusted record reflecting the creation or the updating of data by a user device 102. The transaction records made in the P2P system 108 may generally be cryptographic transactions, e.g., cryptographic transactions implemented through private-public key encryption processes.

In the example of FIG. 1, a user device 102 may be part of a network 104 including a number of peer computers (106a, 106b, 106c) or operating systems on a distributed transaction system. The distributed transaction system may be a centralized or decentralized system. For example, the server 108 or any other device in the network may exhibit a degree of control over the distributed transaction system and the activities within that system. In some embodiments, the server 108 may be configured to operate as a coordinator, a watcher, and/or a special node in the distributed transaction system. The degree to which control is provided may be a tiered system with certain devices having more control than others. In another example, a decentralized distributed transaction system may allow all the devices to share an equal amount of control or the devices might have a hierarchy e.g. a form of governance to enforce the rules of the distributed transaction system. The network 104 may include a local network such as an intranet based on a server 108. The server 108 may host a distributed transaction system that includes a fractal ledger accessible by the user device 102 and peers (106a, 106b, 106c). In another embodiment, the network 104 may be public accessible or public exclusive, meaning that limited members of the public can have access the fractal ledger. In another embodiment, the network 104 may be public accessible and private exclusive constituting, but not limited to, a hybrid to some degree of each of the two embodiments above. It should be noted that the network 104 may be a centralized or decentralized network, or may incorporate aspects of both. In one example, the server 108 may exhibit a degree of control over the network and activities within the network.

In one example, user device 102 may include a hardware processor (e.g., one or more CPUs) communicatively coupled to an electronic data storage (e.g., volatile or non-volatile memory) containing a copy of a fractal ledger. The fractal ledger may include a data structure or other logical structure used to store associated data on common or dedicated electronic data storage (e.g., RAM, a hard-drive, and/or cloud). In certain example embodiments, dedicated hardware devices, such as a hardware security module (HSM), may be used to store information associated with the digital ledger. In certain example embodiments, the fractal ledger may be stored on a dedicated storage hardware externally provided (e.g., storage provided by the server 108) and in communication with the user device 102.

In a functional example, the user device 102 may receive data indicative of a transaction. The data may relate to block specific data, or may relate to payload data stored in a block, or payload data from an external source, such as a personal record. In one example, block specific data may relate to data including block type, block time, transaction time, etc. In another example, payload specific data may relate to user- or machine-generated data, or data that is independent to the block or network structure itself.

The data may include a data file or another aggregated source of data. The user may determine to submit the data to the fractal ledger by generating a new record in the fractal ledger, or by updating related data already stored in the fractal ledger. For example, the user device 102 may generate a new record or block by decrypting the encrypted data in a trusted execution environment locally by parsing the received data into one or more discrete components. In other words, the received data may be "fractalized," or reduced into independent components or categories. For example, fractalization may relate to the process of splitting, dividing, partitioning and/or creating independent components or categories with subsets of subsets of transactions and/or data down to its lowest reducible value while maintaining independent quality of the discrete (fractalized) forms of the transaction and data. In one embodiment, fractalization may be facilitated by using parallel processing to process N subsets of data within M subsets of objects. In this embodiment, N may represent orthogonal elements of data or categories of data, and M may represent orthogonal groups or categories of aggregated data.

In one example, the received data may include a transaction related to a personal record of a new user of a service. The personal record may include data such as the person's name, gender, etc. As such, the personal record may be parsed into certain categories that may be used to organize multiple instance of the data. Table 1 below illustrates an example categorical mapping of data.

TABLE 1

| Category | Description |
| --- | --- |
| Person Profile | Contains information such as name, date of birth, social security number, etc. |
| Prescription | Contains information related to current treatment including the drug, dosage, dates used, etc., and past prescriptions. |
| Blood Pressure | Contains information related to historical blood pressure data, including pressure and associated dates. |

Table 1 may represent one example of categorization. Those of ordinary skill in the art will recognize that other means of identification and categorization of data may be utilized in addition to those described and illustrated herein, such as a string, a look-up table, or an assigned identification value. Additional categories or granularity of categories may also be implemented. The user device 102 may further parse, or fractalize the received data into discrete components and/or categories that each correspond to a unique category. For example, each discrete component of data may correspond to a single category instead of an "umbrella" or aggregate data category. In this example, instead of a "Person Profile" category as shown in Table 1, the person's first name may be associated with a "First Name" category. Similarly, service provider information such as provider name, plan type, plan number, etc., may each be individually categorized as "Provider Name," "Plan Type," and "Plan Number." In other embodiments, the user device 102 may parse the received data indicative of a transaction by reducing the data to its lowest reducible value while maintaining independent data quality.

In another example, the user device 102 may update data already stored in the fractal ledger with data contained in the received data or transaction. The fractal ledger may contain data that has already been parsed, with each discrete piece of data having its own unique storage address. In this example, the categories of received data may relate to a sting value or object value contained in the received data. The user device 102 may utilize a look-up table, matrix, tensor, or index that maps the received data by category or other means, to a storage address in the fractal ledger. As such the user device 102 may parse the received data and update existing data stored on the fractal ledger by mapping the parsed data to a corresponding storage address(es) in the fractal ledger. In one example, the data may be updated using parallel processing of the data. For example, the transaction data may be executed across a plurality of processors, as separate tasks executed by multiple cores on one or more processors, or using parallel computing systems. Optionally, the user device 102 may compare the existing data stored in the fractal ledger with the received data after it has been parsed to determine what data in the digital ledger requires updating and what data does not require updating.

To generate a new record of data in the fractal ledger or to update data already stored in the fractal ledger, the user device 102 may communicate the data to the peers (106a, 106b, 106c) for validation and/or consensus of the data. Upon validation/consensus, the received data may be stored in the fractal ledger and a new block containing a record of the transaction may be created.

Figure 1B:
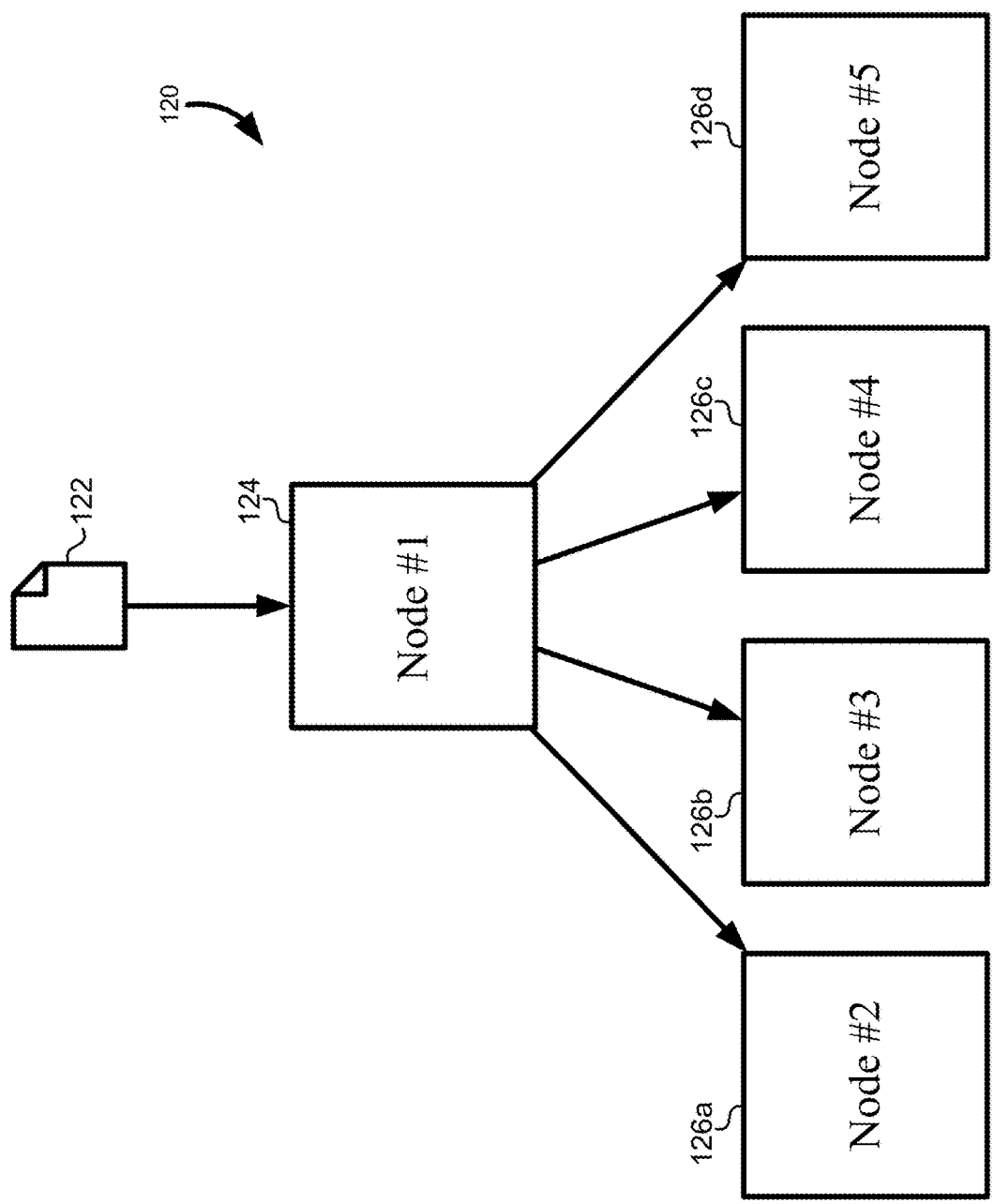
FIG. 1B is a diagram that illustrates how a transaction file can be split between a plurality of different nodes, according to some embodiments.

FIG. 1B is a diagram that illustrates how a transaction file can be split between a plurality of different nodes, according to some embodiments. A local compliant node 124 may receive a file 122 to add to the distributed transaction system. The local compliant node 124 may internally split the file 122 into multiple chunks and/or OrBits. Thereafter, the local compliant node 124 may create a pending transaction on the nexus ledger, reflecting a file storage event. The transaction may include information about the file 122, information about the chunk hash, chunk/OrBit order, and/or chunk/OrBit location. Next, chunks/OrBits may be broadcast across the network via any broadcasting algorithm or protocol.

For example, the file 122 may be broken up into at least four chunks in the example of FIG. 1B. Each of these chunks may be sent to individual participating nodes 126. The local compliant node 124 may wait for a confirmation message from the individual participating nodes 126 indicating that the broadcast chunks/OrBits have been saved in the participating nodes 126. The chunks/OrBits may only be deemed accepted after at least two confirming messages are received, in some embodiments. The confirmation messages may include information about locations of chunks/OrBits in the network, and this information may be recorded into the pending transaction created earlier. When a necessary number of replications has been reached, the pending transaction may be added asynchronously to the nexus ledger.

In the terminology used above, the compliant node may hold, maintain, and update the nexus ledger and/or the fractal ledger. Compliant nodes may use swarm intelligence to optimize governance over multi-parallel processing, including storing, transacting, and updating the distributed transaction system. Fractal nodes may hold, maintain, and process data directed by the compliant node. Fractal nodes may also serve as state channels and/or cardinal chains. Fractal nodes may comprise main pillars of parallel processing with subsets of subsets, where each subset may include a separate computer, network, device, and/or process within each computer, network, and/or device.

The distributed transaction system may also incorporate state channels, which may include a nexus state channel for the nexus ledger and a fractal state channel for the fractal ledger. Nexus and fractal state channels may allow the distributed transaction system to communicate with other public, private, and cross-networks. State channels may include a network parallel to one portion or share of the partitioned ledgers. The role of the state channel may be provided by the portion or share of the partitioned ledger. State channels may be configured to perform parallel processing of transaction data and storage data relative to other state channels, using subsets of subsets or cardinal chains. State channels may also adhere to the consensus mechanism of the applicable portion or share of the partitioned ledger. State channels may be interdependent and/or independent from each such portion or share of the partitioned ledger. Nexus and fractal state channels may provide smart contract interoperability that may manage transactional data as well as storage data.

To increase throughput for machine intelligence, data analytics, and big data computations, some embodiments may also use cardinal chains. Cardinal chains may include a subset of subsets with one or more state channels, wherein one or more cardinal chains may be configured to include a unique address a chunk within one or more of a state channel, partitioned ledger, and/or data storage capability. Cardinal chains generally may allow more computation to be performed in parallel across each of the state channels. Thus, large amounts of machine intelligence and data computations may be processed simultaneously.

FIG. 2 is a conceptual illustration of an example distributed transaction system in a localized environment having interoperability with one or more external distributed transaction systems. In this example, an intranet network 206 may implement within the disclosed features of FIG. 1, while also communicating with devices in an external peer-to-peer network 212. In one embodiment, the intranet network 206 may be limited to participants in an internal peer-to-peer network 208. In this embodiment, the localized distributed transaction system 202 may encompass a business entity or other association of users. However, the localized distributed transaction system 202 may interoperate with external peer-to-peer networks 212 or other distributed transaction systems outside of the intranet network 206. This may provide the benefit of the rapid parallel processing and fractalization of data to external networks. For example, an external system may transmit a personal record to the localized distributed transaction system 202 so that the system may fractalize the data and validate it before updating stored data in the localized system. Of course, the converse may also be provided, wherein fractalized data may be provided to the external peer-to-peer network for rapid validation and storage.

Figure 3:
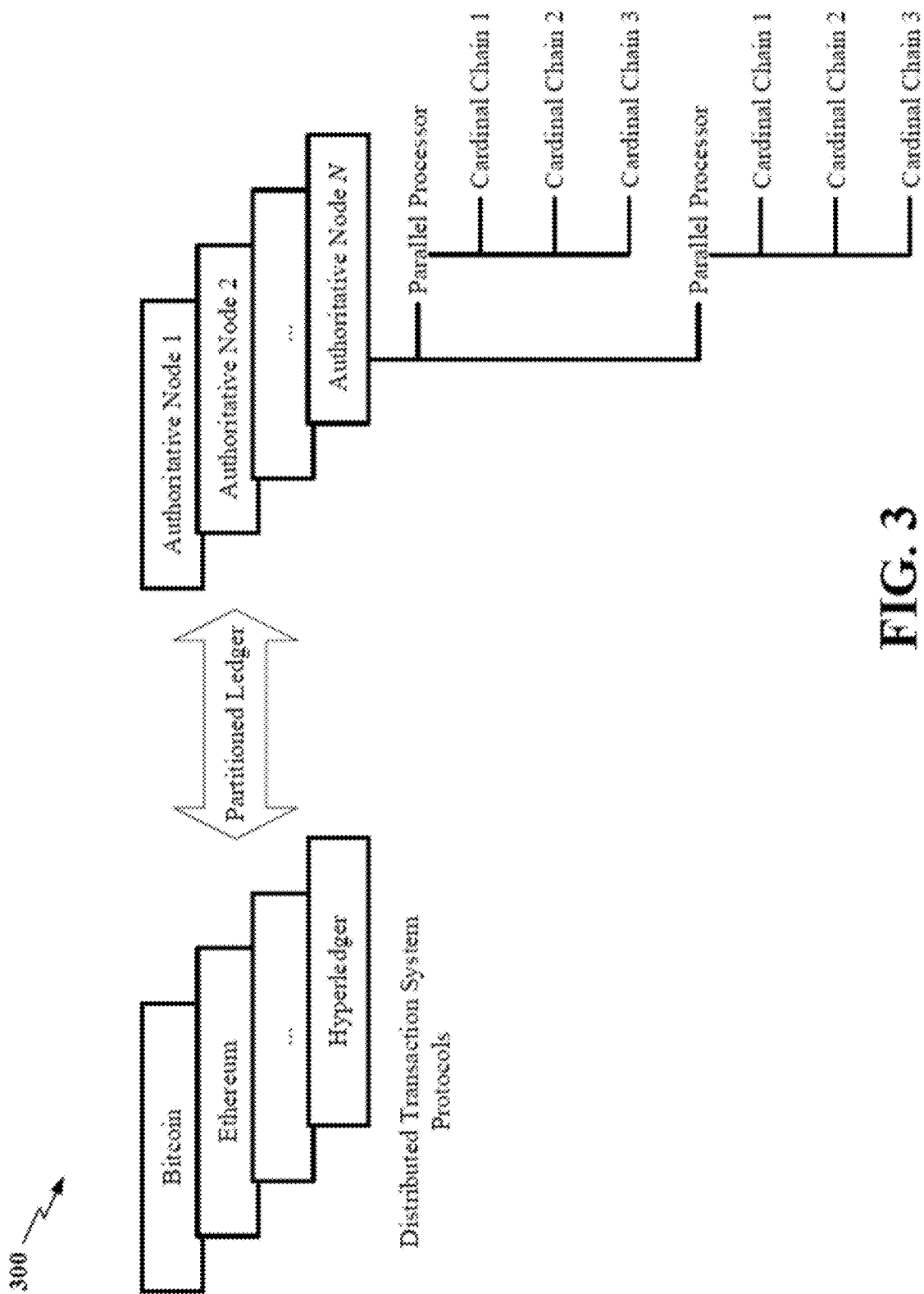
FIG. 3 is a schematic illustration of interoperability between a distributed transaction system utilizing parallel processing over a fractal storage system and other distributed transaction systems, according to some embodiments.

FIG. 3 is a schematic illustration of interoperability between a distributed transaction system utilizing a fractal storage system and other distributed transaction systems. In this example, a partitioned ledger may bridge interoperability between other distributed transaction system protocols and one or more authoritative nodes. In this example, the partitioned ledger may include the totality of the stored fractalized data and a global protocol for bridging interoperability between the disclosed distributed transaction system and other system protocols. The partitioned ledger may also bifurcate the crypto aspects of received transactions and can facilitate fractalization of data associated with the received transactions. The portioned ledger may also act as a fractal extension from of state channels (e.g., different API's and SDK's) to connect to all the differing distributive transaction systems that use a store of value. In some examples, the partitioned ledger may also handle data crypto for native protocols and other protocols, as well as smart contract fuel (gas) in support of interoperability. The partitioned ledger may also support performance of parallel data processing of fractalized or discrete data.

Still referring to FIG. 3, the authoritative nodes may relate to nodes in the native distributed transaction system. The parallel processors may relate to the physical articulation of parallel processing computers that perform parallel processing of fractalized, or discrete data. In some examples, there may be multiple levels of data associated with the parallel processing (e.g., categories of data). In this example, multiple cardinal chains at a first level of fractalization may be processed in parallel by a first processor, whereas multiple cardinal chains at another level of fractalization may be processed in parallel by a second processor simultaneously with the first level of fractalization or by the first processor in series with the first level of fractalization. In this example, the cardinal chains may relate to data inside each state channels (or parallel processor) and may include data that is independent or orthogonal or cardinal to other data in another cardinal chain. Each parallel processor may be configured to perform multiple tasks, and those are the tasks/processes may verify and update the data based on a request, fetch, pre-fetch or query received from the respective ledger state channels.

Figure 4:
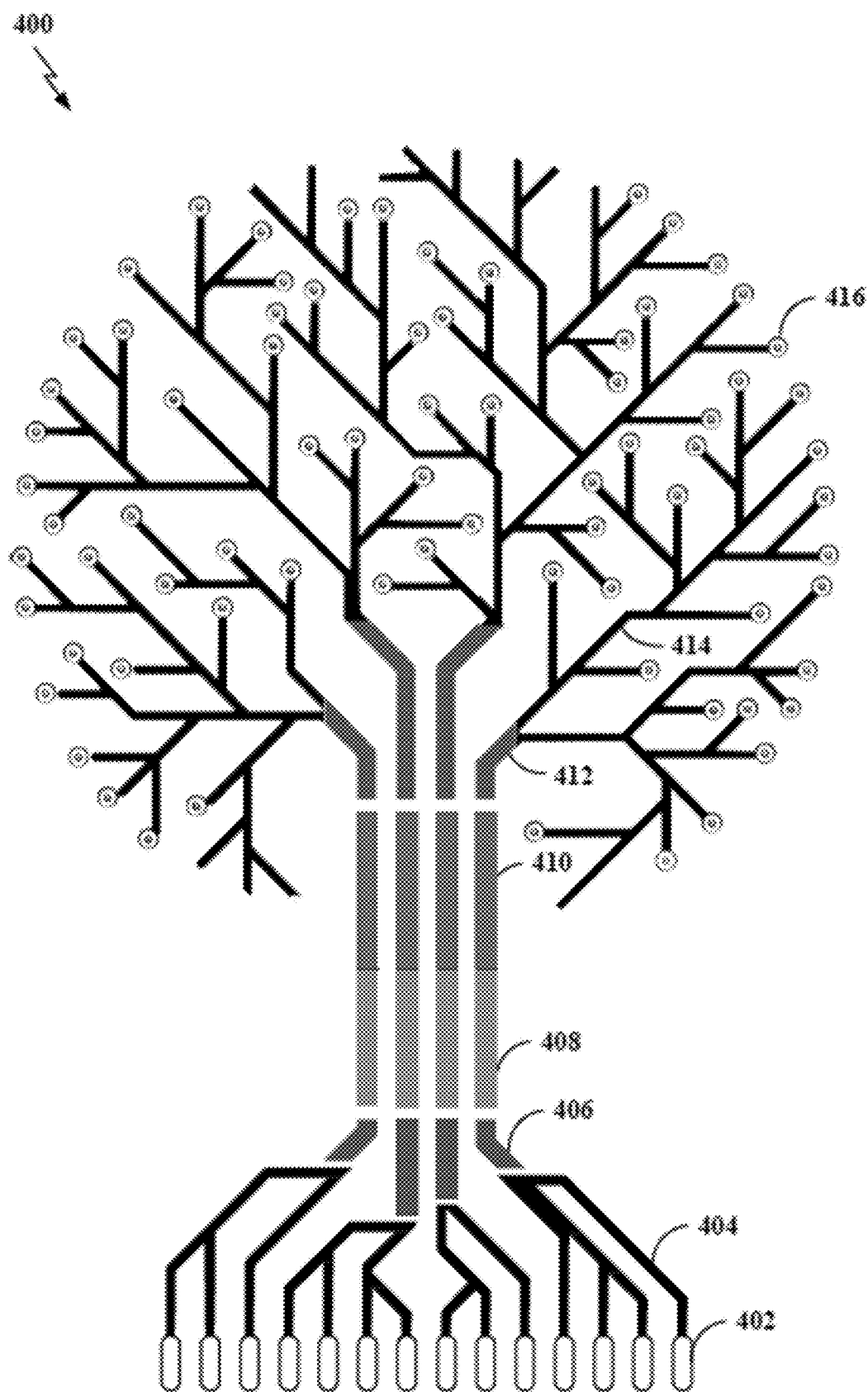
FIG. 4 is a conceptual diagram of an example two-dimensional data fractal, according to some embodiments.

FIG. 4 is a conceptual diagram of an example two-dimensional data fractal 400. In this example, interoperability between the disclosed distributed transaction system utilizing parallel processing over a fractal storage system, and other distributed transaction systems is illustrated in the "root system" including reference numbers 402, 404, and 406. A nexus ledger 408 supports transactional data and multi-chain interoperability with the other distributed transaction systems, and may be configured to transact crypto data and store corresponding metadata. The fractal ledger 410 may support communication and storage of data and perform gas calculations. The authoritative nodes (406, 412) may relate to trusted nodes in the disclosed distributed transaction system. The fractal state channels 414 may relate to the parallel processing of data in cardinal chains. They may establish a relationship (e.g., category) between a group of cardinal chains that indicates the group can be subject to parallel processing. The fractal cardinal chains 416 may relate to data subset or discrete portions of data that is stored in a block and subject to parallel processing.

Figure 5:
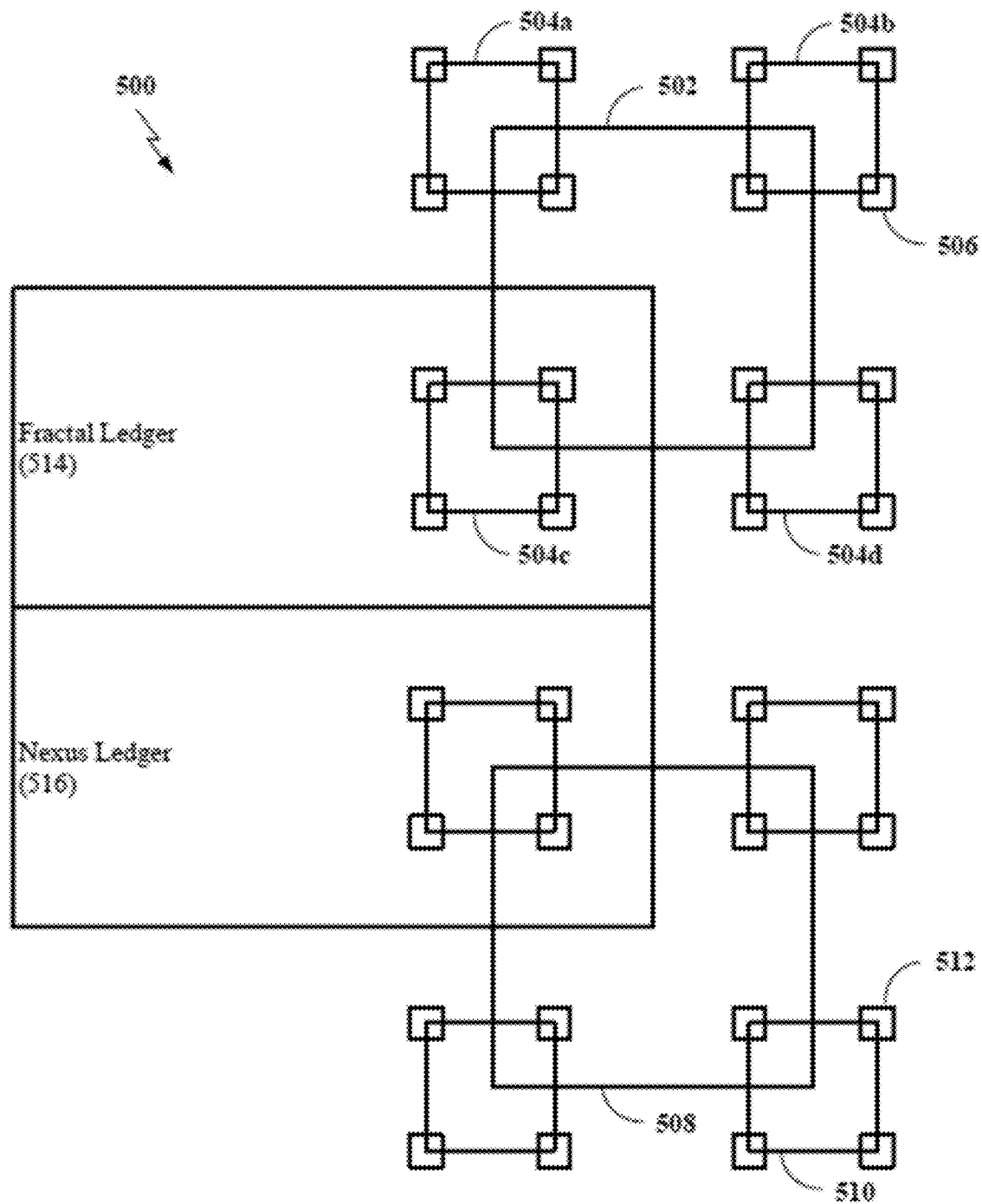
FIG. 5 is a conceptual diagram of another example two-dimensional data fractal, according to some embodiments.

FIG. 5 is a conceptual diagram of another example two-dimensional T-square fractal that may represent a bifurcated consensus mechanism 500. In mathematics, the illustrated T-square may be a two-dimensional fractal. It may have a boundary of infinite length bounding a finite area. In the context of this disclosure, the T-square fractal 500 may represent a successive reduction of data from an aggregate data source (the partitioned ledger) to individual instances of discrete data. The granularity of the discrete data may vary based on a parameter associated with the user device 102 or the transaction. In one example, the partitioned ledger may be configured as a bifurcated consensus mechanism including the fractal ledger 514 and a nexus ledger 516. This partition may provide for separation of transactional data from storage data in order to maximize throughput and scalability. In one example, a first one or more processors may operate in parallel to process the transactional data, while a second one or more processor may operate in parallel to process storage functions. The fractal ledger 514 may be configured as a stateless ledger to perform gas calculations, store active batches or chunks of big data, transact chunks of big data from one blockchain to another, and push calculations to the nexus ledger 516. The nexus ledger 516 may be configured as a stateful ledger to serve various types of transactions that include currency, multi-chain interoperability, and metadata transactions.

The bifurcated consensus mechanism 500 of FIG. 5 may be representative of a group of aggregated data at a first level. Using parallel processing, that group of data may be fractalized into two or more groups at a second level. In the example of FIG. 5, a first group 502 and a second group 508 may include all or a portion of the data in the bifurcated ledger 514 of the first level. The data in both the first group 502 and the second group 508 may overlap (contain one or more instances of duplicate data) or the data of each group may be distinct from the data in another group. Through parallel processing, the data in the first group may be further fractalized into additional groups at a third level. In the example of FIG. 5, the data of the first group may be fractalized into two or more distinct groups (504a, 504b, 504c, 504d). These distinct groups (504a, 504b, 504c, 504d) may contain instances of duplicate data or may each be distinct from other groups at the third level. The fractalization of groups of data may continue until the data has been reduced to its lowest reducible form value while maintaining independent quality and orthogonality. In the case where duplicate data exists in multiple groups on a single level, parallel processing may be employed to eliminate the duplicate data once the data has been reduced to its lowest reducible form in order to maintain orthogonality.

Still referring to FIG. 5, the groups and levels of data may be organized based on categories or components based on the particular transaction or data being fractalized. As those skilled in the art will readily appreciate, FIG. 5 is an example representation of one form of a fractalization procedure described in this disclosure, and is provided solely to aid in the understanding of the disclosure.

Hardware Implementation

Figure 6:
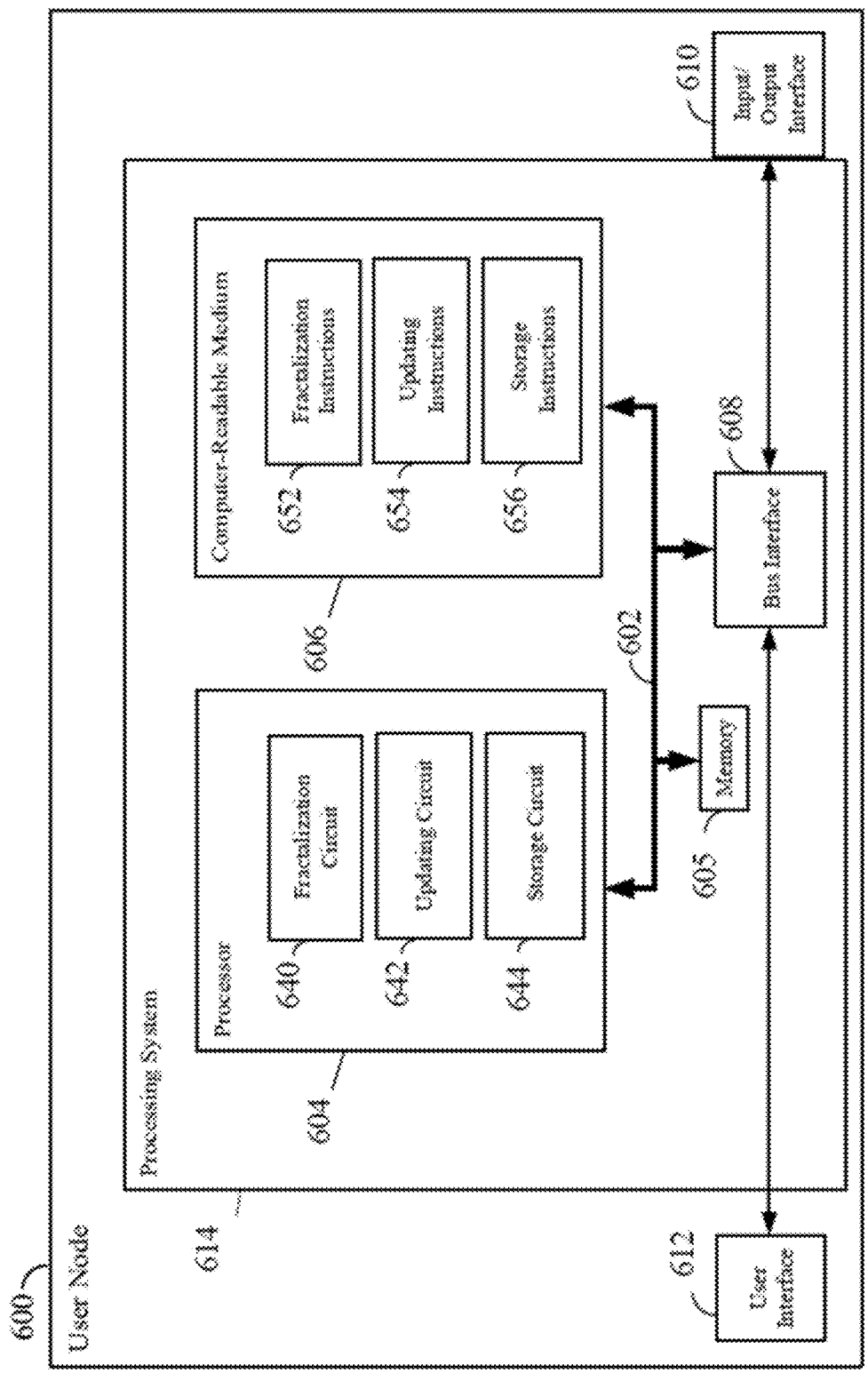
FIG. 6 is a block diagram illustrating an example hardware implementation for a computing or processing node for operating a node in a distributed transaction system, according to some embodiments.

FIG. 6 is a block diagram illustrating an example hardware implementation for a computing or processing node for operating a node in a distributed transaction system. For example, the user node 600 may be a processing device, computer, or server as illustrated in any one or more of FIG. 1 and/or FIG. 2.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits. A bus interface 608 provides an interface between the bus 602 and an input/output interface 610. The input/output interface 610 provides a communication interface or means for communicating with various other apparatus over a transmission medium. Depending upon the nature of the apparatus, a user interface 612 (e.g., keypad, display, speaker, microphone, joystick, dApp, App) may also be provided. Of course, such a user interface 612 is optional, and may be omitted in some examples, such as a server or gateway.

In some aspects of the disclosure, the processor 604 may include fractalization circuitry 640 configured for various functions, including, for example, fractalizing data from a source aggregate of data, and supporting a parallel processing of multiple instances of the fractalized data. For example, the fractalization circuitry 640 may be configured to implement one or more of the functions described below in relation to FIG. 7 and/or FIG. 8.

In some aspects of the disclosure, the processor 604 may include updating circuitry 640 configured for various functions, including, for example, determining the content, orthogonality, irreducibility, and classification of data stored and/or processed on a cardinal chain and determining what instances of the data need to be updated with new data obtained via a transaction, query or request. The update circuitry may also support the generation of a new block in a digital or fractal ledger. For example, the updating circuitry 642 may be configured to implement one or more of the functions described below in relation to FIG. 7 and/or FIG. 8.

In some aspects of the disclosure, the processor 604 may include storage circuitry 644 configured for various functions, including, for example, determining a block address or cardinal chain address for storing each instance of fractalized data from a source aggregate of data. For example, the storage circuitry 644 may be configured to implement one or more of the functions described below in relation to FIG. 7 and/or FIG. 8.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software and perform fractalization of data in a parallel processing manner. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), solid state drive (SSD), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include fractalization software 652 configured for various functions, including, for example, supporting the functionality of the fractalization circuit 640. In one or more examples, the computer-readable storage medium 606 may include updating software 654 configured for various functions, including, for example, supporting the functionality of the updating circuit 642. In one or more examples, the computer-readable storage medium 606 may include storage software 656 configured for various functions, including, for example, supporting the functionality of the storage circuit 644.

Figure 7:
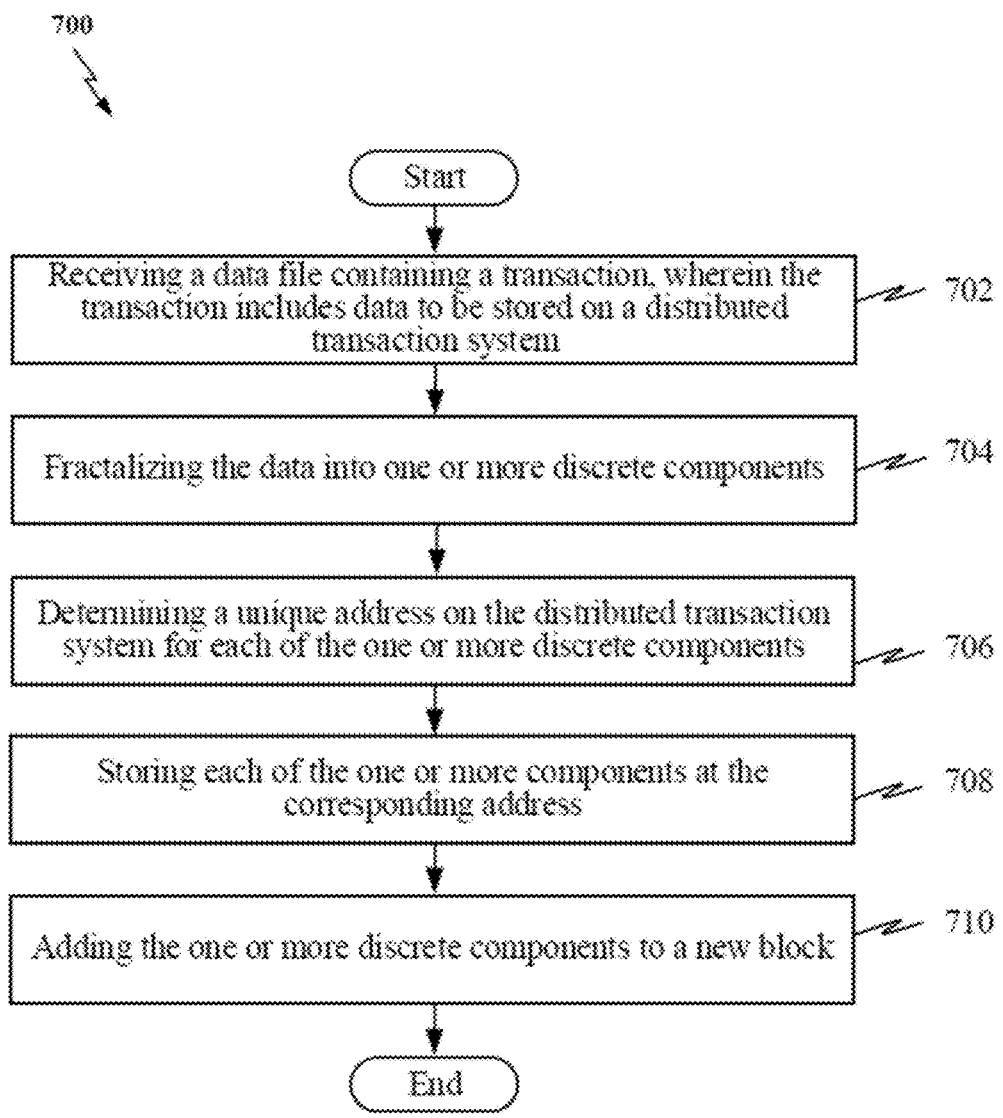
FIG. 7 is a flow chart illustrating an exemplary process for fractalizing data contained in a transaction, storing the fractalized data, and adding the fractalized data to a block, according to some embodiments.

FIG. 7 is a flow chart illustrating an exemplary process 700 for fractalizing data contained in a transaction, storing the fractalized data, and adding the fractalized data to a block or cardinal chain in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the user node 600 illustrated in FIG. 6. In some examples, the process 700 may be carried out by any suitable apparatus or means for carrying out the functions or algorithm described below.

At block 702, the user node 600 may receive a data file containing a transaction, wherein the transaction includes data to be stored on a distributed transaction system or network. The data file may include an aggregate of data that can be reduced to independent and discrete forms. At block 704, the user node 600 may use parallel processing to fractalize or parse the aggregate data into one or more discrete components. Each component may be identifiable by a memory address, a category of data, a unique source of the data, a parameter of the data, or any other unique characteristic of the data. At block 706, the user node may determine to store the one or more discrete components or the product of the fractalized data in a block or cardinal chain in the distributed transaction system. The user node 600 may determine that storage of the data requires the generation of a genesis block or other similar implementation of a new digital or fractal ledger, or generation of a new authoritative node. The user node 600 may request or query the generation of the block from a network of peers or, based on authority of the user node 600, unilaterally generate the new genesis block or other similar implementation of a new digital or fractal ledger, or generation of a new authoritative node.

At block 708, the user node may determine a unique address for storing each of the one or more discrete components within the distributed transaction system. For example, each address may correspond to a block, a portion of a block, or a cardinal chain. In some instances, the user node 600 may request authority for the storage transaction, or may act on its own. At block 710, the user node 600 may store the one or more discrete components to a new block or cardinal chain.

In one configuration, the user node 600 includes means for fractalizing data contained in a transaction, storing the fractalized data, and adding the fractalized data to a block or cardinal chain, means for receiving a data file containing a transaction, means for determining a unique address on the distributed transaction system for each of the one or more discrete components, means for storing each of the one or more components at the corresponding address, and means for adding the one or more discrete components to a new block. In one aspect, the aforementioned means may be the processing system 614 shown in FIG. 6 configured to perform the functions recited by the aforementioned means. In another aspect, the aforementioned means may be a circuit or any apparatus configured to perform the functions recited by the aforementioned means.

In the above examples, the circuitry included in the one or more processors 604 is merely provided as an example, and other means for carrying out the described functions may be included within various aspects of the present disclosure, including but not limited to the instructions stored in the computer-readable storage medium 606, cloud service or any other suitable apparatus or means described herein.

Figure 8:
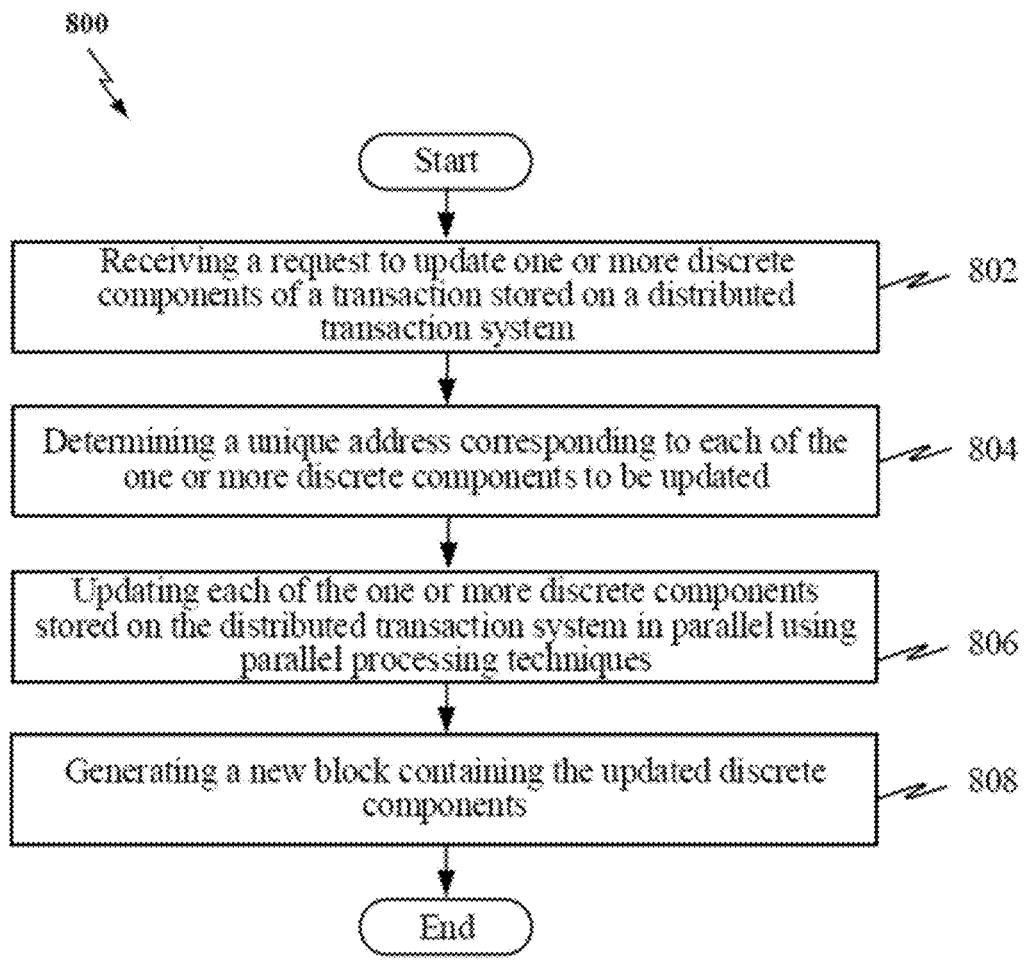
FIG. 8 is a flow chart illustrating an exemplary process for updating a block in the distributed transaction system using parallel processing of the fractalized data, according to some embodiments.

FIG. 8 is a flow chart illustrating an exemplary process 800 for updating one or more blocks in the distributed transaction system using parallel processing of the fractalized data. As described below, some or all illustrated features may be omitted in a particular implementation within the scope of the present disclosure, and some illustrated features may not be required for implementation of all embodiments. In some examples, the process 800 may be carried out by the user node 600 illustrated in FIG. 6. In some examples, the process 800 may be carried out by any suitable apparatus or means for carrying out the functions or algorithm described below.

At block 802, the user node 600 may receive or transmit a request or query to update one or more discrete components of a transaction stored on a distributed transaction system. For example, new data related to the payload of one or more blocks, graphs or chains may be received, along with a request or query to update the data. If the new data has not been fractalized or reduced to an appropriate discrete value, the user node 600 may fractalize the data in accordance with user or software supplied instructions. At block 804, the user node may determine a unique address corresponding to a block or chain location for each of the one or more discrete components to be updated and map a corresponding component of the new data being used to update. At block 806, the user node 600 may update the one or more discrete components stored on the distributed transaction system in parallel using a parallel processing technique. The update may occur after validation from other users in the distributed transaction system. At block 808, the user node 600 may generate a new block containing the updated discrete components or a record of the updated components.

In one configuration, the user node 600 may include means for receiving and/or transmitting a request or query to update one or more discrete components of a transaction stored on a distributed transaction system, means for determining a unique address corresponding to each of the one or more discrete components to be updated, means for update each of the one or more discrete components stored on the distributed transaction system in parallel using parallel processing techniques, and means for generating a new block containing the updated discrete components. In one aspect, the aforementioned means may be the processor(s) 604 configured to perform the functions recited by the aforementioned means in FIG. 6. In another aspect, the aforementioned means may be a circuit or any apparatus configured to perform the functions recited by the aforementioned means.

In the above examples, the circuitry included in the processor(s) 604 is merely provided as an example, and other means for carrying out the described functions may be included within various aspects of the present disclosure, including but not limited to the instructions stored in the computer-readable storage medium 606, or any other suitable apparatus or means described herein.

Additional Considerations

Several aspects of a distributed transaction system have been presented with reference to an exemplary implementation. As those skilled in the art will readily appreciate, various aspects described throughout this disclosure may be extended to other transaction systems, architectures, protocols, and standards. By way of example, various aspects may be implemented within other distributive transaction protocols and/or consensus mechanisms. The actual standard, architecture, protocol, and/or standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Due to the ever-changing nature of computers and networks, the description of computer system in FIG. 6 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of processing data stored in a distributed system, the method comprising:
   receiving, by a processing system, a transaction to be stored on a distributed ledger system;
   fractalizing, by the processing system, data associated with the transaction into a plurality of orthogonal components that represent independent subsets of the data;
   determining, by the processing system, unique addresses on the distributed ledger system for each of the plurality of orthogonal components;
   storing, by the processing system, each of the plurality of orthogonal components at the corresponding unique addresses in a first ledger, wherein the first ledger is configured to store data associated with transactions after being fractalized, and operations performed by the first ledger are performed using parallel processing techniques;
   adding, by the processing system, a transaction block to a second ledger that is different from the first ledger, wherein the transaction block represents the transaction and comprises the unique addresses in the first ledger for each of the plurality of orthogonal components, and the second ledger is configured to store records of the transactions separately from the data associated with the transactions;
   receiving a request to update the data associated with the transaction;
   determining the unique addresses in the first ledger from the transaction block in the second ledger; and
   updating the plurality of orthogonal components using parallel processing techniques.

2. The method of claim 1, wherein the first ledger executes a consensus algorithm in parallel on two or more of the plurality of orthogonal components.

3. The method of claim 1, wherein the first ledger is distributed across a plurality of different computing systems.

4. The method of claim 1, wherein the first ledger comprises a directed acyclic graph (DAG) or blockDAG structure.

5. The method of claim 1, wherein the second ledger stores hashes for each of the plurality of orthogonal components and an order for each of the plurality of orthogonal components.

6. The method of claim 1, wherein fractalizing the data into the plurality of orthogonal components comprises:
   annotating, by the processing system, each of the plurality of orthogonal components within a state space.

7. The method of claim 1, further comprising:
   receiving, by the processing system, confirmation messages from the first ledger that the plurality of orthogonal components have been processed; and
   adding, by the processing system, the transaction block to the second ledge rafter a threshold number of confirmation messages have been received.

8. The method of claim 1, further comprising:
   receiving, by the processing system, a request to query the data in the first ledger;
   accessing, by the processing system, the transaction block in the second ledger;
   accessing, by the processing system, the unique address on the distributed system for each of the plurality of orthogonal components; and accessing, by the processing system, each of the plurality of orthogonal components in the first ledger.

9. The method of claim 1, wherein gas calculations are performed on the first ledger in parallel.

10. The method of claim 1, wherein fractalizing the data into the plurality of orthogonal components comprises:
generating a hierarchical structure comprising one or more subsets.

11. A system comprising:
one or more processors; and
one or more memory devices comprising instructions that, when executed by the one or more processors, cause the one or more processors to perform operations comprising:
receiving, by a processing system, a transaction to be stored on a distributed ledger system;
fractalizing, by the processing system, data associated with the transaction into a plurality of orthogonal components that represent independent subsets of the data;
determining, by the processing system, unique addresses on the distributed ledger system for each of the plurality of orthogonal components;
storing, by the processing system, each of the plurality of orthogonal components at the corresponding unique addresses in a first ledger, wherein the first ledger is configured to store data associated with transactions after being fractalized, and operations performed by the first ledger are performed using parallel processing techniques;
adding, by the processing system, a transaction block to a second ledger that is different from the first ledger, wherein the transaction block re presents the transaction and comprises the unique addresses in the first ledger for each of the plurality of orthogonal components, and the second ledger is configured to store records of the transactions separately from the data associated with the transactions;
receiving a request to update the data associated with the transaction;
determining the unique addresses in the first ledger from the transaction block in the second ledger; and
updating the plurality of orthogonal components using parallel processing techniques.

12. The system of claim 11, wherein the second ledger uses a bifurcated consensus mechanism.

13. The system of claim 11, wherein the transaction block further comprises metadata for the transaction.

14. The system of claim 11, wherein the operations further comprise:
pushing one or more gas calculations from the first ledger to the second ledger.

15. The system of claim 11, wherein fractalizing the data associated with the transaction comprises:
dividing the data into a plurality of categories of data, wherein each of the plurality of categories are independent from the rest of the plurality of categories, and the plurality of orthogonal components are divided between the plurality of categories.

16. The system of claim 11, wherein the second ledger is interoperable with a plurality of third-party networks.

17. The system of claim 11, wherein storing each of the plurality of orthogonal components comprises:
broadcasting each of the plurality of orthogonal components to a distributed network of computing devices.

18. The system of claim 11, wherein the plurality of orthogonal components are divided between a plurality of cardinal chains.

19. The system of claim 11, wherein the transaction represents a medical record.

20. One or more non-transitory computer-readable media comprising instructions that, when executed by one or more processors, cause the one or more processors to perform operations comprising:
receiving, by a processing system, a transaction to be stored on a distributed ledger system;
fractalizing, by the processing system, data associated with the transaction into a plurality of orthogonal components that represent independent subsets of the data;
determining, by the processing system, unique addresses on the distributed ledger system for each of the plurality of orthogonal components;
storing, by the processing system, each of the plurality of orthogonal components at the corresponding unique addresses in a first ledger, wherein the first ledger is configured to store data associated with transactions after being fractalized, and operations performed by the first ledger are performed using parallel processing techniques;
adding, by the processing system, a transaction block to a second ledger that is different from the first ledger, wherein the transaction block represents the transaction and comprises the unique addresses in the first ledger for each of the plurality of orthogonal components, and the second ledger is configured to store records of the transactions separately from the data associated with the transactions;
receiving a request to update the data associated with the transaction;
determining the unique addresses in the first ledger from the transaction block in the second ledger; and
updating the plurality of orthogonal components using parallel processing techniques.

* * * * *